United States Patent
Blond et al.

(10) Patent No.: US 11,520,603 B2
(45) Date of Patent: Dec. 6, 2022

(54) METHOD FOR CONFIGURING A COOKING APPLIANCE BY A TERMINAL

(71) Applicant: SEB S.A., Ecully (FR)

(72) Inventors: Laurent Blond, Beaune (FR); Sébastien Volatier, Dijon (FR); Antony Masson, Lyons (FR)

(73) Assignee: SEB S.A.

( * ) Notice: Subject to any disclaimer, the term of this patent is extended or adjusted under 35 U.S.C. 154(b) by 0 days.

(21) Appl. No.: 16/098,373

(22) PCT Filed: Apr. 28, 2017

(86) PCT No.: PCT/FR2017/051028
§ 371 (c)(1),
(2) Date: Nov. 1, 2018

(87) PCT Pub. No.: WO2017/191395
PCT Pub. Date: Nov. 9, 2017

(65) Prior Publication Data
US 2019/0121650 A1   Apr. 25, 2019

(30) Foreign Application Priority Data

May 3, 2016 (FR) ...................... 1653986

(51) Int. Cl.
*G06F 9/44* (2018.01)
*G06F 9/445* (2018.01)
(Continued)

(52) U.S. Cl.
CPC .......... *G06F 9/4451* (2013.01); *A47J 36/321* (2018.08); *A47J 37/0611* (2013.01); *G06F 9/44505* (2013.01)

(58) Field of Classification Search
None
See application file for complete search history.

(56) References Cited

U.S. PATENT DOCUMENTS 5,545,881 A * 8/1996 Chai ................... H05B 6/6447
219/719
6,299,921 B1 * 10/2001 Löffler .................... F24C 7/08
426/233
(Continued)

FOREIGN PATENT DOCUMENTS

| CN | 105095361 A | 11/2015 |
| EP | 2 840 319 A1 | 2/2015 |
| KR | 20160026870 A | 3/2016 |

OTHER PUBLICATIONS

International Search Report as issued in International Patent Application No. PCT/FR2017/051028, dated Jun. 22, 2017.

*Primary Examiner* — Danny Chan
(74) *Attorney, Agent, or Firm* — Lerner, David, Littenberg, Krumholz & Mentlik, LLP

(57) ABSTRACT

A method for configuring a cooking appliance by a terminal capable of exchanging data according to a communication protocol with the cooking appliance, the configuration method including creating and/or selecting a cooking program, the cooking program (prog), creating and/or selecting a desired cooking state corresponding to a state of progress of the implementation of the cooking program, determining cooking configuration data from the cooking program and/or the desired cooking state, and sending the cooking configuration data to the cooking appliance.

8 Claims, 5 Drawing Sheets

(51) Int. Cl.
*A47J 36/32* (2006.01)
*A47J 37/06* (2006.01)

(56) References Cited

U.S. PATENT DOCUMENTS

| | | | |
|---|---|---|---|
| 6,549,818 B1* | 4/2003 | Ali | H05B 6/688 |
| | | | 700/90 |
| 2003/0139843 A1* | 7/2003 | Hu | A47J 36/321 |
| | | | 700/211 |
| 2008/0280000 A1* | 11/2008 | Breunig | A23L 5/15 |
| | | | 426/523 |
| 2009/0061070 A1* | 3/2009 | Greiner | F24C 7/08 |
| | | | 426/665 |
| 2010/0211468 A1* | 8/2010 | Breunig | G06Q 50/12 |
| | | | 705/15 |
| 2013/0149679 A1* | 6/2013 | Tokuda | G09B 19/0092 |
| | | | 434/127 |
| 2014/0348987 A1 | 11/2014 | Cheng et al. | |
| 2015/0312964 A1* | 10/2015 | Sorenson | H05B 1/0266 |
| | | | 219/448.13 |
| 2016/0051078 A1 | 2/2016 | Jenkins et al. | |
| 2017/0016623 A1* | 1/2017 | Rabie | F24C 15/327 |
| 2017/0139385 A1* | 5/2017 | Young | G05B 19/048 |
| 2017/0221353 A1* | 8/2017 | Luckhardt | F24C 15/023 |

* cited by examiner

METHOD FOR CONFIGURING A COOKING APPLIANCE BY A TERMINAL

CROSS-REFERENCE TO RELATED APPLICATIONS

This application is the U.S. National Stage of International Application Serial No. PCT/FR2017/051028, filed Apr. 28, 2017, which in turn claims priority to French Application No. 1653986, filed May 3, 2016. The contents of all of these applications are incorporated herein by reference in their entirety.

This invention concerns a method for configuring a cooking appliance by a terminal.

It is known to have a cooking appliance and a terminal able to communicate together according to a communication protocol. This arrangement allows remote command of the cooking appliance.

In this way, it is possible to remotely control and command the cooking appliance to execute a cooking program corresponding to the cooking of a determined food.

This type of functioning requires good communication between the cooking appliance and the terminal. The user must also always have the terminal at his disposal in order to command the cooking appliance, which may prove to be restrictive.

This invention aims to solve all or a portion of the drawbacks mentioned above.

For this purpose, this invention also concerns a method for configuration of a cooking appliance by a terminal able to exchange information with the cooking appliance according to a communication protocol, the configuration method comprising the following steps:
  creation and/or selection of a cooking program, said cooking program comprising a relationship between a cooking time and a cooking temperature, and/or
  creation and/or selection of a desired doneness corresponding to an implementation progress status of the said cooking program,
  determination and/or selection of a cooking parameterization information item based on and/or corresponding to the said cooking program and of the desired doneness,
  sending of the said cooking parameterization information item to the cooking appliance.

According to one aspect of the invention, the said cooking time corresponds to a period during which a heating element of the cooking appliance is activated to cook a food. Preferably, a temperature maintenance time follows the cooking time. This arrangement allows the food not to cool after the end of the cooking.

The configuration method allows a user to create and/or select a cooking parameterization information item that will allow the cooking appliance to determine and/or select a corresponding cooking setpoint.

The cooking setpoint corresponds to an adaptation of the relationship between the cooking time and the cooking temperature of the cooking program and possibly of the desired doneness.

Said adaptation is necessary so that the cooking appliance carries out the cooking according to the cooking program and/or the desired doneness.

This arrangement is useful as it is possible to define a cooking setpoint not contained in the memory of the cooking appliance and to apply it to the cooking of a food.

When a user wishes to carry out the cooking of a food according to a new cooking setpoint, it is therefore not necessary to modify or replace the cooking appliance.

In addition, the control and command of the cooking are locally managed by a control and command unit of the cooking appliance. The configuration method consists of determining and/or selecting cooking parameters that will then be applied by the cooking appliance to a food to be cooked.

The command unit ensures that the cooking setpoint is applied.

The cooking parameterization information item is determined through the terminal, for example by the application of a calculation function, or is selected in the terminal's memory from a plurality of saved cooking parameterization information items.

The terminal is designed so that there is a link in the memory between each cooking parameterization information item saved and a defined cooking program and/or a defined desired doneness.

According to one aspect of the invention, the cooking parameterization information item comprises a set of coefficients corresponding to a time evolution of the cooking temperature.

The control and command unit of the cooking appliance comprises a processor able to interpret this set of coefficients and to determine a corresponding cooking setpoint.

According to one aspect of the invention, the method of configuration of a cooking appliance through a terminal also comprises the following steps:
  creation and/or selection of a user profile comprising a user identifier,
  assignment of the said cooking parameterization information item to the said user profile.

This arrangement allows assigning the cooking parameterization information item to a user profile. In this way, it is possible to save the user's cooking parameterization information item to then reuse it.

This arrangement is useful if a user wants to have a personalized cooking parameterization information item, for example if the cooking program is related to a particular food, or if he wants a particular cooking progress status, for example between medium and well-done.

In this way, the user does not have to recreate a new cooking parameterization information item each time: the one he created previously and assigned to his user profile can be reused.

According to one aspect of the invention, a first user profile is assigned to a first cooking parameterization information item and a second user profile is assigned to a second cooking parameterization information item.

The configuration method thus permits defining several cooking parameterization information items, each of them being assigned to a user. It is therefore possible to configure several cookings before sending to the cooking appliance.

This arrangement is also useful when the first user and the second user choose the same cooking program. In this case, the cooking appliance is designed to allow simultaneous cooking of a first food of the first user and of a second food of the second user.

The desired donenesses may be different for the first user and the second user. In this case, the first food and the second food will not be removed from the cooking appliance at the same time after cooking.

According to one aspect of the invention, the configuration method comprises a step of the terminal receiving at least one cooking program and/or at least one desired doneness and/or at least one cooking parameterization information item from a server.

The cooking programs as well as the desired donenesses generally used are available to the users and can be transferred to the terminal.

Thus, the user does not have to create a cooking program or a desired doneness.

The same is true for the cooking parameterization information items related to the cooking programs and desired donenesses which are known to the server. The determination step thus consists for the terminal of selecting the parameterization information item that it already contains in its memory or downloading it from the server.

Alternatively, the determination may consist of a calculation performed by the terminal. This arrangement is interesting when there is no connection to the server.

This invention also concerns a computer program product comprising code instructions designed to implement the steps of a configuration method as described previously when the said program is executed on a processor of a terminal.

According to one aspect of the invention, the computer program product is designed as an application that can be downloaded to a terminal.

This invention further concerns a terminal comprising in memory the code instructions of a computer program product as described above and designed to execute such a computer program product.

This invention also concerns a cooking appliance comprising:
  a cooking system with a cooking site designed to receive a food and comprising a heating element designed to heat the said food,
  a communication unit able to exchange information with a remote terminal according to a communication protocol, the communication unit being designed to receive a cooking parameterization information item,
  a control and command unit of the cooking system comprising a processor designed to regulate a cooking temperature of the heating element during a cooking time according to a cooking setpoint, the control and command unit comprising a user interface provided with a command for selecting a category of food from among a plurality of categories of food, the control and command unit being designed to be arranged in a first configuration in which the said cooking setpoint is dependent on the selected category of food, or alternatively in a second configuration in which the said cooking setpoint is dependent on the cooking parameterization information item received by the communication unit.

In this way, the cooking appliance is able to function independently according to the first configuration. In fact, it is not necessary to have a terminal in order to select a category of food to be cooked.

According to one aspect of the invention, the selection command is further designed for the selection of a desired doneness, the said cooking setpoint in addition being dependent on the said selection of a desired doneness in the first configuration.

The first configuration thus offers a user the possibility of selecting a category of food and a desired doneness.

However, the user's choice is limited to the food categories saved in the processor's memory. Thus, the second configuration extends the number of food categories by using the cooking parameterization information item received by the communication unit.

Thus, it is possible in the second configuration to cook foods in a category not defined and according to a desired doneness not defined in the memory of the cooking appliance processor.

In this way, it is not necessary to change the control and command unit each time a category of food is added.

In addition, the ability to change the configuration offers a flexibility of use: the cooking appliance functions alone as well as when connected to a remote terminal.

According to one aspect of the invention, the cooking parameterization information item comprises a set of coefficients.

In this way, the cooking parameterization information item is a brief information item in the form of cooking parameters that are taken into account by the processor in the second configuration.

According to one aspect of the invention, each category of food is defined by a set of coefficients saved in the processor's memory.

The processor defines the cooking setpoint identically based on a set of coefficients whether the cooking appliance is in the first configuration or the second configuration.

The cooking follows a program whose parameters are coefficients contained in the processor's memory in the first configuration or downloaded coefficients in the second configuration.

According to one aspect of the invention, the user interface comprises a connection indicator designed to transmit a signal to the user when the communication unit is able to exchange information with the remote terminal according to a communication protocol.

This arrangement makes it possible to know whether communication has been established between the cooking appliance and the terminal. The user thus knows that it is possible to move from the first configuration—operation in non-connected mode—to the second configuration—operation in connected mode.

According to one aspect of the invention, the user interface comprises a switch command for switching from the first configuration to the second configuration.

The cooking parameterization information item can be received at any time by the communication unit. This cooking parameterization information item is then stored in the processor's memory.

The user can then, as he chooses, use the selection command to start cooking according to the first configuration, or use the switch command to start cooking according to the second configuration.

The switch command thus appears to the user as an additional category of food in relation to the plurality of food categories of the selection command.

According to one aspect of the invention, the processor is designed to apply a verification function to the cooking parameterization information item, the result of which is either a conformity indicator or an anomaly indicator for the said cooking parameterization information item.

The verification function is thus a security measure allowing the processor to determine whether or not it can use the cooking parameterization information item received. This arrangement prevents the use of an erroneous cooking parameterization information item.

According to one aspect of the invention, the communication unit is designed to receive and save in the processor's memory at least two cooking parameterization information items.

This arrangement ensures that it is not necessary to load a cooking parameterization information item each time if the latter is used regularly.

According to one aspect of the invention, each cooking parameterization information item is related to a cooking program, that is, to a category of food.

Typically, this category of food is not included in the plurality of food categories saved in the memory of the processor.

According to another aspect of the invention, each cooking parameterization information item is related to a desired doneness, such as rare, medium or well-done.

Thus, the fact that the processor can comprise in its memory several cooking parameterization information items allows two foods to be cooked in relation to the same cooking program at the same time, even if their desired donenesses are different.

A first user can thus obtain a food cooked rare and a second user can obtain the same food cooked well-done in a single cooking. In fact, the well-done food must simply be left in the cooking site for a longer time.

According to one aspect of the invention, the communication unit is designed to transmit a feedback information item to the terminal, the feedback information item comprising an indication of the cooking temperature and/or of the remaining cooking time and/or an intervention notification.

This arrangement allows remote monitoring of the cooking of the food. In particular, the user is able to know the remaining cooking time before he goes to get his cooked food. Thus, the user is not forced to stay next to the cooking appliance or to know the cooking time in advance in order to know when he must return to the cooking appliance.

According to one aspect of the invention, the communication unit is designed to send a plurality of feedback information items, a defined time interval separating the sending of two consecutive information items.

This arrangement allows saving energy in that the time interval between two sendings may be high.

According to one aspect of the invention, the communication unit is designed to send the feedback information item according to a specific processor order.

This arrangement allows the measuring device to communicate the feedback information item to the terminal as quickly as possible on a one-off basis. This arrangement is useful when the processor detects a malfunction.

According to one aspect of the invention, the intervention notification includes a message for the user, for example "return the food to the cooking site," or an anomaly report such as "a food is in the cooking site during preheating."

According to one aspect of the invention, the control and command unit is designed to carry out a preheating of the heating element according to the cooking setpoint and to transmit an information item on the preheating status.

In other words, the preheating status informs the user whether he can place his food to be cooked in the cooking site of the cooking appliance.

The preheating depends on the type of food that will be cooked, since it depends on the cooking setpoint.

According to one aspect of the invention, the preheating information item comprises an indication of the remaining preheating time.

This arrangement makes it possible to know how long to wait before the food to be cooked can be arranged in the cooking appliance.

According to one aspect of the invention, the control and command unit of the cooking appliance is designed to transmit the preheating status information item to an alert device of the user interface and/or to the terminal via the communication unit.

When the user is close to the cooking appliance, the alert device lets him know when the preheating is finished and when he can put his food to heat in the cooking appliance.

If the user is far from the appliance but has his terminal with him, he will also receive a notification informing him that he can put his food in the cooking appliance.

According to one aspect of the invention, the processor of the control and command unit is designed to transmit a doneness information item comprising an indication of the remaining cooking time according to the cooking setpoint.

This arrangement alerts the user of the time remaining before his food is cooked.

According to one aspect of the invention, the user interface is designed to display content related to the said cooking information item and/or in which the communication unit is designed to transmit the said cooking information item according to the communication protocol.

During the cooking of the food, the user can in this way be alerted of the remaining cooking time by means of the user interface of the cooking appliance and/or through its terminal.

According to one aspect of the invention, the said cooking time corresponds to a period during which a heating element of the cooking appliance is activated to cook a food. Preferably, a temperature maintenance time follows the cooking time. This arrangement allows the food not to cool after the end of the cooking.

According to one aspect of the invention, the cooking appliance comprises a sensor intended to measure at least one physical volume relative to a food placed in the cooking site, the cooking setpoint being dependent on the said physical volume measured.

In addition to the cooking parameterization information item used to determine the cooking setpoint, the processor is designed to take into account the said physical volume measured.

Thus, the food category selected using the selection command or the cooking parameterization information item provide information as to the type of food to cook, and the sensor provides information as to the size or quantity of the said food to be cooked.

With this set of information, the processor can then determine the appropriate cooking setpoint.

According to one aspect of the invention, the physical volume is a surface area occupied by a food and/or a thickness of the food. In other words, the surface area occupied by the food corresponds to a variation in temperature due to the thermal effusivity of the food measured by a temperature sensor.

This arrangement provides complete knowledge of the food to be cooked: the type of food and the physical volume. Thanks to the cooking parameterization information item and the value of the said physical volume, the processor can thus determine the appropriate cooking setpoint to apply to the food.

According to one aspect of the invention, the user interface further comprises a thermal adaptation command, the cooking setpoint being dependent on a status of the said thermal adaptation command.

According to one aspect of the invention, one status of the thermal adaptation command corresponds to food in a frozen condition. In this case, the processor takes this initial condition of the food into account to determine the cooking setpoint to apply.

According to one aspect of the invention, the cooking setpoint comprises one or more time ranges, each defined by a target cooking temperature and a duration. In particular, preheating corresponds to a time range of the said cooking setpoint. The cooking time corresponds to a single time range covering the totality of the cooking time or a series of time ranges covering this same cooking time.

This invention also concerns a method of using a cooking appliance as described above, comprising the following steps:
  sending a cooking parameterization information item to a communication unit of the cooking appliance according to a communication protocol,
  placing a control and command unit of a cooking system of the cooking appliance in a second configuration in which the said cooking setpoint is determined by a processor of the control and command unit according to the cooking parameterization information item received by the communication unit,
  launching the cooking setpoint.

According to one aspect of the invention, the launching of the cooking setpoint may be validated by an interaction with the user interface or by a validation at the terminal.

This invention further concerns a computer program product comprising code instructions designed to implement the steps of a method as described above, when the said program is executed on a processor of a terminal.

According to one aspect of the invention, the computer program product is designed as an application that can be downloaded to a terminal.

This invention further concerns a terminal comprising in memory the code instructions of a computer program product as described above and designed to execute such a computer program product.

In any event, the invention will be fully understood with the assistance of the following description in reference to the attached schematic drawings representing, as non-restrictive examples, one form of execution of this method for configuring a cooking appliance by a terminal.

Figure 1:
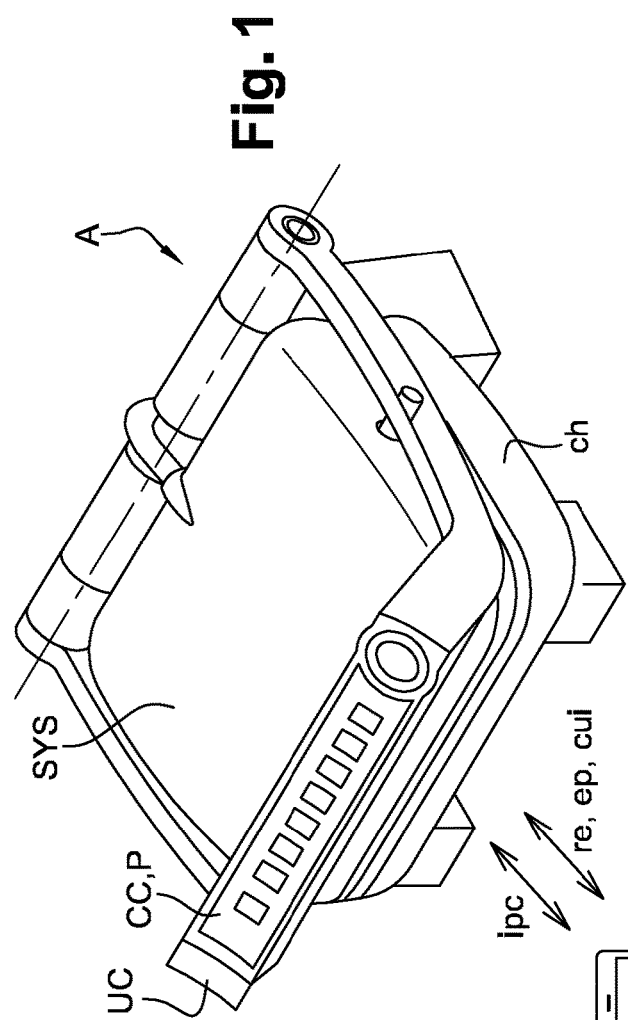
FIG. 1 is a perspective view of a cooking appliance and of a terminal.
Figure 2:
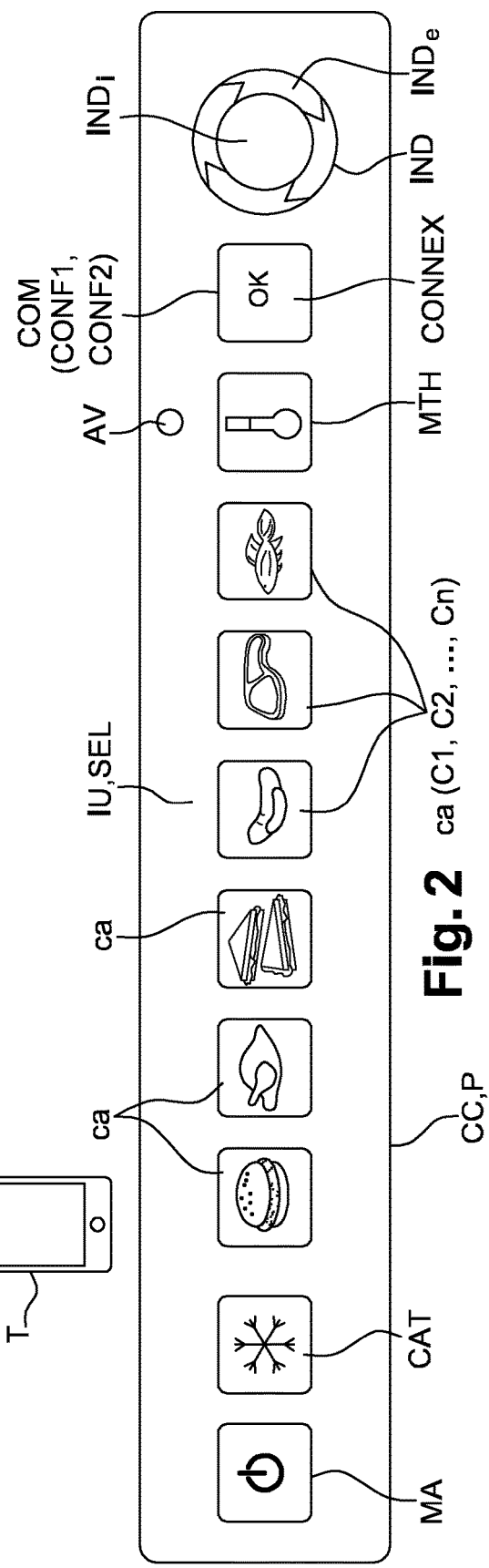
FIG. 2 is a front view of the user interface of the cooking appliance.
Figure 3:
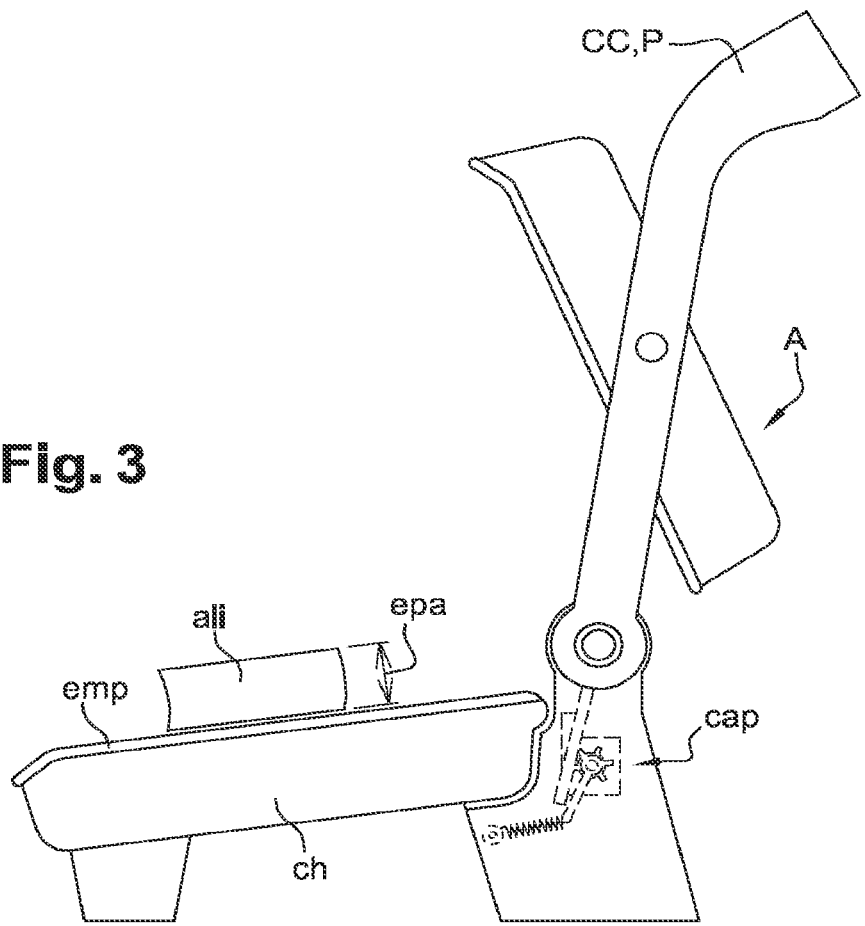
FIG. 3 is a side view of the open cooking appliance.

As illustrated in FIGS. 1 to 3, a cooking appliance A comprises a cooking system SYS provided with a heating element ch and a cooking site emp for a food ali.

In FIG. 1, the cooking appliance A is closed: this is the cooking position and in FIG. 3 the cooking appliance A is open: this is the position for placing a food ali in or removing a food ali from the cooking site emp.

The cooking appliance A comprises a communication unit UC provided with a communication card designed to communicate with a remote terminal T according to a communication protocol. The communication protocol is a wireless radio communication protocol.

The cooking appliance A also comprises a control and command unit CC designed to command and control the cooking system SYS.

For the control of the cooking system SYS, the cooking appliance A also comprises a sensor cap able to measure a physical volume.

This sensor cap may be a thickness sensor cap designed to measure a thickness of the food ali arranged in the cooking site emp or a stress sensor cap designed to measure a charge or a mass of the food ali arranged in the cooking site emp.

As illustrated in FIGS. 1 and 2, the control and command unit CC comprises a processor P equipped with a memory and designed to regulate a cooking temperature Te of the heating element ch for a cooking time t according to a cooking setpoint co.

The control and command unit CC comprises a user interface IU provided with a selection command SEL for selecting a food category ca from among a plurality of food categories ca.

In practice, the user recognizes the food category ca with the icon displayed and can select a food category ca by pressing on said icon.

The user interface IU comprises a thermal adaptation command CAT which is an option that a user can choose by pressing on it. This option can be selected when the food ali placed is frozen, to permit the processor P to adapt the cooking setpoint co.

The user interface IU also comprises an on-off button MA, an alert device AV designed to light up when the preheating is finished, a cooking indicator IND and a button for manual regulation of the thermostat MTH.

The cooking indicator IND comprises an external circular part INDe provided with several portions of different colors, each color corresponding to a doneness such as "rare," "medium" or "well-done."

The change from one color to another may be gradual, as in a rainbow. A central part INDi of the cooking indicator IND has a color which changes depending on the doneness of the food ali. The color change is also gradual.

The user can then compare the color of the central part INDi to the colors of the external part INDe and visually determine the doneness of his food.

For example, the user can see that the central color corresponding to a "medium" doneness is rather close to the "well-done" doneness.

This arrangement also allows two identical foods ali to be cooked at the same time in the cooking site and allows a first food ali to be removed before cooking the second if the first food must be cooked less than the second.

The manual regulation button of the thermostat MTH is an alternative to the selection command SEL.

If the user presses on the manual regulation button of the thermostat MTH, he can manually adjust a cooking temperature Te himself.

To use the cooking appliance A autonomously, that is, without using a remote terminal T, the user selects a food category ca with the selection command SEL or the manual regulation button of the thermostat MTH.

If the food to be cooked is frozen, the user also presses on the thermal adaptation command CAT.

Starting at this moment, preheating begins and the user is alerted of the end of preheating when the alert device AV lights up. At this moment the user opens the cooking appliance A and places his food ali in the cooking site emp and then closes the cooking appliance A again.

The cooking indicator IND then gradually changes color to inform the user of the cooking progress. The processor P is designed to determine this color based on the cooking setpoint co and the measurement taken by the sensor cap.

The cooking appliance can also rely on a temperature measured by another dedicated sensor at the cooking site emp.

The mode of operation described above corresponds to a first configuration CONF1 of the cooking appliance A. According to this first configuration CONF1, the cooking appliance A is able to operate fully autonomously, that is, without a terminal T.

The processor P is designed to determine the cooking parameters based on a set of coefficients C1, C2, . . . Cn. These coefficients C1, C2, . . . Cn are values used by the processor P to determine the cooking setpoint co.

The cooking setpoint co corresponds to one or more time ranges, the range or each range being defined by a target cooking temperature Te and a target cooking time t.

Thus, a cooking setpoint co for a particular food ali may, for example, be a high first temperature Te for five minutes and then a lower temperature Te for ten minutes.

In operation according to the first configuration CONF1, each food category ca that the user may select through the selection command SEL corresponds to a particular set of coefficients C1, C2, . . . Cn.

The processor P then applies the same determination calculation for the cooking setpoint co based on each set of coefficients C1, C2, . . . Cn.

The processor P is also designed to verify that each set of coefficients C1, C2, . . . Cn that it receives is coherent in its own right and that these are not randomly determined coefficients C1, C2, . . . Cn.

To do this, the processor P is designed to apply a verification function fv to the coefficients C1, C2, . . . Cn of a set of coefficients C1, C2, . . . Cn and to obtain a result r. This may be a sum of certain coefficients C1, C2, . . . Cn.

The processor P is also designed to analyze the result r and determine based on this result r a conformity indicator or an anomaly indicator. If no anomaly is detected, the processor P may begin the cooking by preheating.

Figure 4:
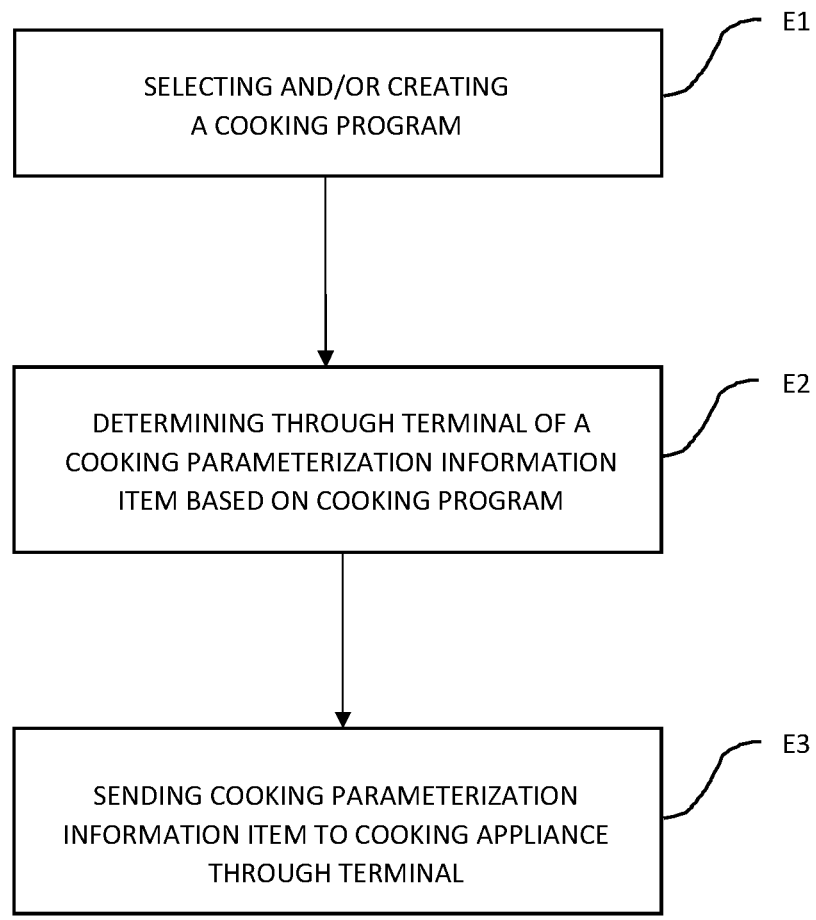
FIG. 4 is a flowchart of a method of using the cooking appliance.
Figure 5:
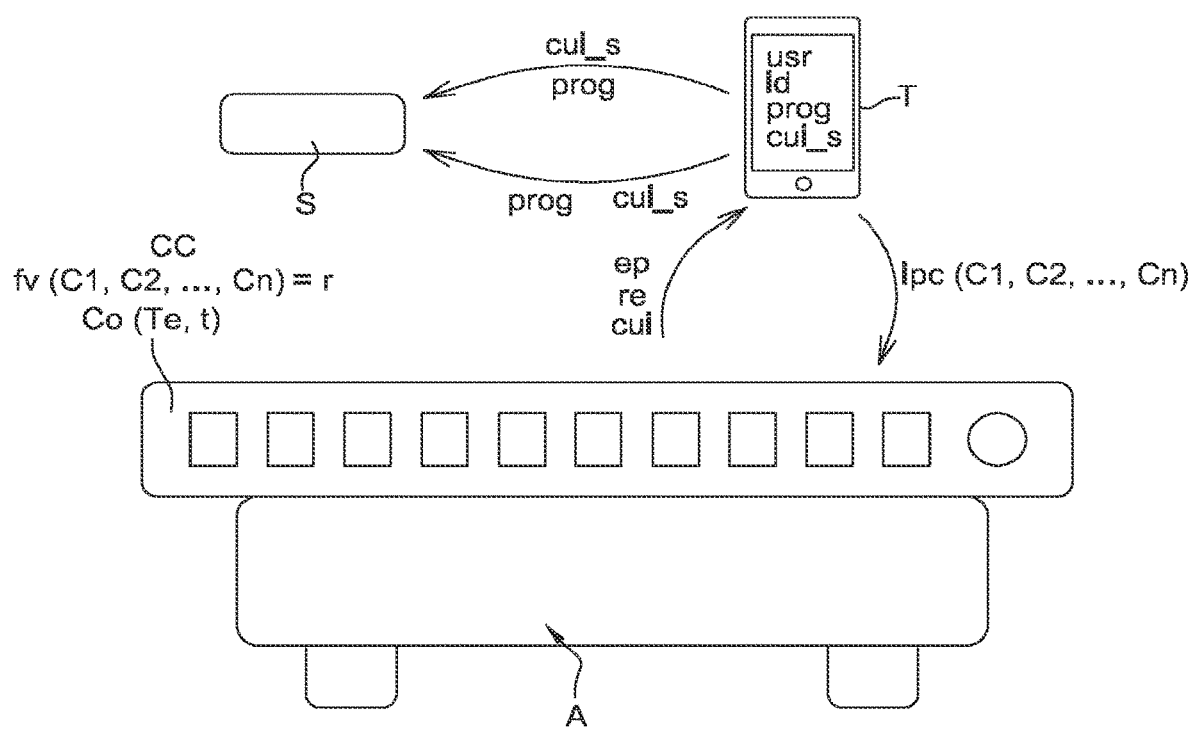
FIG. 5 is a schematic view of the cooking appliance, of the terminal and of a server.

As illustrated in FIGS. 1, 4 and 5, the cooking appliance A is also designed to operate according to a second configuration CONF2 in which the terminal T is used.

Figure 6:
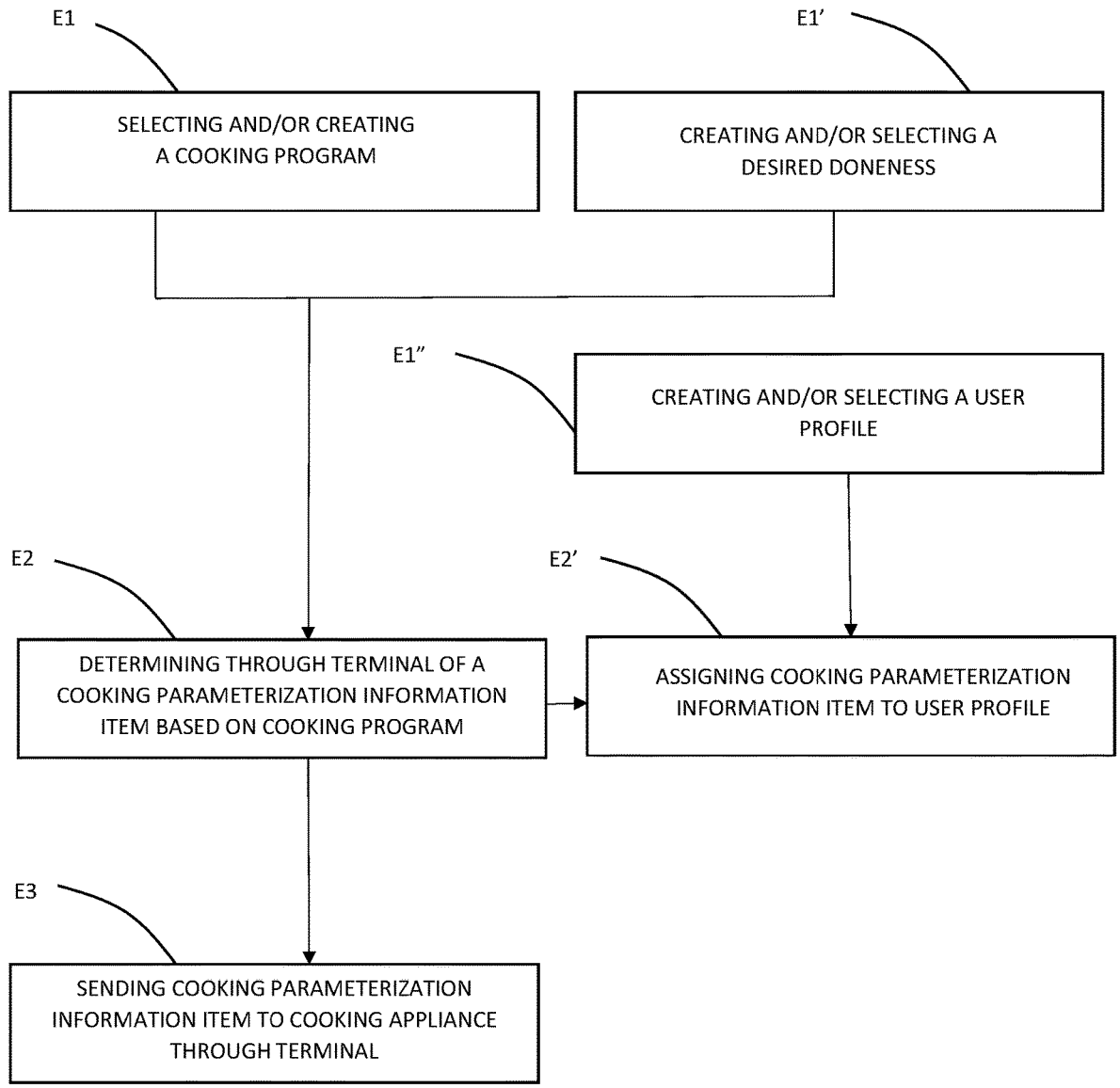
FIG. 6 is a flowchart of a method of configuration of the cooking appliance through the terminal.

According to this second configuration CONF2, a method of configuration of the cooking appliance A through the terminal T according to FIG. 6 may be performed.

The terminal T also comprises a processor able to execute a computer program product in the form of a downloadable application implementing the steps of the configuration method.

A step e1 of the configuration method is a step of creation and/or selection of a cooking program prog, said cooking program prog comprising a relationship between a cooking time t and a cooking temperature Te.

A step e1', which may be performed independently of the step e1, is a step of creation and/or selection of a desired doneness cui_s corresponding to an implementation progress status of the said cooking program prog. For example, it may be a doneness such as "medium" or "well-done."

This step e1' may be considered optional. The advantage is that the user will have feedback on the display of his terminal T when the desired doneness has been reached. If this step is not performed, the user will only have an indication of the cooking progress.

A step e1" may also be performed independently of steps e1 and e1'. This is a step e1" of creation and/or selection of a user profile usr comprising a user identifier id.

Before or parallel with the performance of steps e1, e1' and e1", an optional step e0 consists of receiving via the terminal T at least one cooking program prog and/or at least one desired doneness cui_s and/or at least one cooking parameterization information item ipc coming from a server S and/or at least one user profile usr.

A user profile usr received may be associated with the at least one cooking program prog and/or the at least one desired doneness cui_s and/or the at least one cooking parameterization information item ipc coming from a server S.

This step also explains how the cooking program prog and/or the desired doneness cui_s may be selected based on information coming from the server S.

Synchronization with the server S is also possible by sending a cooking program prog and/or a desired doneness cui_s and/or a corresponding user profile usr.

A step e2 then consists of determination through the terminal T of a cooking parameterization information item ipc based on said cooking program prog and/or on the desired doneness cui_s.

The cooking parameterization information item ipc determined comprises a set of coefficients C1, C2, . . . Cn, it being possible for said set to be interpreted by the processor P of the cooking appliance A in order to determine a cooking setpoint co.

The cooking parameterization information item ipc also optionally comprises information related to the desired doneness cui_s.

A step e2' following the step e2 consists of assigning the said cooking parameterization information item ipc to the said user profile usr. This arrangement in particular permits providing for several cooking parameterization information items ipc for a user usr or for several users usr.

These cooking parameterization information items ipc may be saved in the memory of the processor of the terminal T or in the memory of the server S since the server S is able to exchange information with the terminal T.

Finally, the configuration method ends with a step e3 of sending the said cooking parameterization information item ipc to the cooking appliance A through the terminal T. It is also possible to send several cooking parameterization information items ipc to the cooking appliance A.

The cooking appliance is able to receive several cooking parameterization information items ipc in order to perform several successive cookings or two simultaneous cookings of two identical foods.

When the cooking appliance A receives a cooking parameterization information item ipc, it may be in the first configuration CONF1. To switch to the second configuration CONF2, the user interface comprises a switch command COM.

When the user presses on the switch command COM, the cooking appliance A switches to the second configuration CONF2, and preheating begins.

The processor P had previously determined a cooking setpoint co dependent on the coefficients C1, C2, . . . Cn of the cooking parameterization information item ipc received after having verified the conformity of the coefficients C1, C2, . . . Cn with the verification function fv. This determination can be performed as soon as the cooking appliance A receives an information item or quickly before the start-up of preheating when the user presses on the switch command COM.

The user interface IU also comprises a connection indicator CONNEX designed to transmit a light signal when the communication unit is able to exchange information with the remote terminal according to a communication protocol.

This arrangement informs the user that it is possible to press on the switch command COM.

The continuation of cooking takes place in an identical manner in the second configuration CONF2: preheating begins and the alert device AV lights up when the latter is finished.

In the second configuration CONF2, the communication unit UC is designed to send to the terminal T an information item on the preheating status ep comprising an indication of the remaining preheating time, this information item being determined by the processor P.

This arrangement is useful because in the second configuration CONF2, the user is not forced to stay close to the cooking appliance A since his terminal T alerts him of the end of preheating.

The user then places his food ali in the cooking site emp and then closes the cooking appliance A again.

As well as during preheating, the communication unit UC is designed to send during cooking information on the doneness cui determined by the processor P.

This information may correspond to the color of the cooking indicator IND and/or to an indication of the end of cooking if the cooking parameterization information item ipc that was sent contained information related to the desired doneness cui_s.

The user is then alerted by his terminal T of the end of cooking and is not forced to stay close to the cooking appliance A during cooking.

More generally in the second configuration CONF2, the cooking appliance A is designed to send a feedback information item re to the terminal T containing various information concerning the operation of the cooking appliance A.

The feedback information item re may in particular comprise an indication of the cooking temperature and/or an intervention notification.

The intervention notification may include a message for the user, for example "return the food to the cooking site," or an anomaly report such as "a food is in the cooking site during preheating."

Also, when several users have each sent a cooking parameterization information item ipc to the cooking appliance A, this feedback information item re makes it possible to know which cooking program prog has been launched.

It is also to be noted that only one cooking parameterization information item ipc sent to the communication unit UC allows the cooking appliance A to perform its cooking.

In fact, after sending this information through the terminal T, the communication between the cooking appliance A and the terminal T may be interrupted without affecting the cooking.

This arrangement is useful because in this way the cooking appliance A is configured to receive at least one cooking parameterization information item ipc and store it in memory so that the corresponding cooking program prog is performed multiple times without the need to use the terminal T again.

The terminal T thus appears as an extension of the processor P of the measuring device A, allowing new cooking programs prog to be loaded without being dependent on good communication between the terminal T and the cooking appliance A.

A user who does not have a terminal will not be penalized in that he will still be able to use the cooking appliance.

The terminal T and the cooking appliance A may possibly be designed so that the terminal T acts as a remote command of the processor P. A user then chooses the order of programs launched.

As illustrated in FIG. 4, the terminal T is designed to perform the steps of a method for using the cooking appliance A. According to a first step, the terminal carries out a sending E1 of a cooking parameterization information item ipc as detailed below.

As an alternative to what is described above, the terminal T may remotely carry out a step E2 of arranging a second configuration CONF2 without the need to press on the switch command COM, then a step E3 of launching the cooking setpoint co, in particular to start the preheating.

However, it should be noted that the cooking setpoint co as well as the verification of the parameters are still performed by the processor P of the cooking appliance A. Thus, the cooking appliance A maintains its autonomous functioning, only the commands are remote.

As goes without saying, the invention is not limited to the form of execution of this method for configuring a cooking appliance by a terminal, described above as an example; on the contrary, it encompasses all embodiment variants.

The invention claimed is:

1. A method for configuration of a cooking appliance by a terminal able to exchange information according to a communication protocol with the cooking appliance, the configuration method comprising the following steps:
   creating or selecting a cooking program, said cooking program comprising a relationship between a cooking time and a cooking temperature, or
   creating or selecting a desired doneness corresponding to an implementation progress status of the said cooking program,
   determining a cooking parameterization information item based on the cooking program or selecting the cooking parameterization information corresponding to the desired doneness, wherein the cooking parameterization information item comprises a set of coefficients corresponding to a time evolution of the cooking temperature, and wherein the coefficients are values used by the processor to determine a cooking setpoint corresponding to one or more time ranges, the one or more time ranges defined by a target cooking temperature and a target cooking time, and
   determining an operation mode of the cooking appliance from among a first configuration and a second configuration based on an actuation or lack thereof a switch command on the cooking appliance, wherein, in the first configuration, the cooking appliance is operated to cook a first item in a non-connected mode and, in the second configuration, the cooking appliance is operated to cook a second item in a connected mode,
   when the cooking appliance is operated to cook the second item in the connected mode, the method further comprises:
      sending said cooking parameterization information item to the cooking appliance, and
      applying a verification function to said cooking parameterization information item by a processor of the cooking appliance,
   wherein, in the first configuration, the set of coefficients of the cooking parameterization information item are coefficients already contained in a memory of the processor, and in the second configuration, the set of coefficients of the cooking parameterization information item are coefficients downloaded from a remote source.

2. The method for configuring a cooking appliance by a terminal according to claim 1, further comprising:
   creating or selecting a user profile comprising a user identifier, and assigning said cooking parameterization information item to said user profile.

3. The method of configuring a cooking appliance by a terminal according to claim 2, wherein a first user profile is assigned to a first cooking parameterization information item and a second user profile is assigned to a second cooking parameterization information item.

4. The method of configuration according to claim 1, comprising receiving by the terminal at least one cooking program and/or at least one desired doneness and/or at least one cooking parameterization information item from a server.

5. A non-transitory computer readable medium encoded with a program comprising code instructions designed to implement the steps of a method of configuration according to claim 1 when the program is executed on a processor of a terminal.

6. The non-transitory computer readable medium according to claim 5, wherein the program is designed as an application that can be downloaded to a terminal.

7. A terminal comprising a non-transitory computer readable medium according to claim 5.

8. The method for configuring a cooking appliance by a terminal according to claim 1, further comprising:
    determining, by the processor of the cooking appliance, one of a conformity indicator or an anomaly indicator, based on the application of the verification function.

* * * * *